US006810041B2

(12) United States Patent
Walker, III et al.

(10) Patent No.: US 6,810,041 B2
(45) Date of Patent: Oct. 26, 2004

(54) INTEGRATED ACCESS DEVICE

(75) Inventors: Kenneth Lee Walker, III, Raleigh, NC (US); Dieter H. Nattkemper, Raleigh, NC (US); Robert S. Kroninger, Wake Forest, NC (US)

(73) Assignee: ADC DSL Systems, Inc., Eden Prairie, MN (US)

( * ) Notice: Subject to any disclaimer, the term of this patent is extended or adjusted under 35 U.S.C. 154(b) by 9 days.

(21) Appl. No.: 10/191,331

(22) Filed: Jul. 9, 2002

(65) Prior Publication Data

US 2003/0012184 A1 Jan. 16, 2003

Related U.S. Application Data

(60) Provisional application No. 60/383,048, filed on May 24, 2002.

(30) Foreign Application Priority Data

| Jul. 13, 2001 | (JP) | ........................................ 2001-213316 |
| May 16, 2002 | (JP) | ........................................ 2002-141184 |

(51) Int. Cl.[7] .............................................. H04L 12/28
(52) U.S. Cl. ......................... 370/397; 370/468; 370/498
(58) Field of Search ................................ 370/352, 353, 370/355, 357, 360, 389, 395.1, 464, 465, 466, 468, 498, 397, 399, 396

(56) References Cited

U.S. PATENT DOCUMENTS

| 6,009,106 A | * | 12/1999 | Rustad et al. ................ 370/523 |
| 6,052,374 A | | 4/2000 | Stephens |
| 6,160,810 A | | 12/2000 | Brodigan |
| 6,198,745 B1 | | 3/2001 | Brodigan |
| 6,349,098 B1 | * | 2/2002 | Parruck et al. ............ 370/395.6 |
| 6,388,990 B1 | | 5/2002 | Wetzel |
| 6,560,225 B1 | * | 5/2003 | Czajkowski et al. ........ 370/356 |
| 6,574,313 B1 | * | 6/2003 | Chea et al. ................ 379/93.09 |
| 6,580,254 B2 | * | 6/2003 | Schofield .................... 323/234 |
| 6,606,383 B1 | | 8/2003 | Robinson et al. |
| 2001/0015978 A1 | | 8/2001 | Blanset et al. |
| 2002/0071440 A1 | | 6/2002 | Cerami et al. |
| 2003/0185385 A1 | | 10/2003 | Boudreaux, Jr. et al. |

FOREIGN PATENT DOCUMENTS

| WO | WO 01/26313 A1 | 4/2001 | |
| WO | WO 01/73987 A2 | 10/2001 | |
| WO | WO 02/091791 | * 11/2002 | ........... H04Q/11/04 |

OTHER PUBLICATIONS

Bhattacharyya. "New Challenges for Telephone Companies to Secure Switching Systems" IEEE. Oct. 1–3, 1991. pp. 41–46.*

(List continued on next page.)

Primary Examiner—Chi Pham
Assistant Examiner—Derrick W. Ferris
(74) Attorney, Agent, or Firm—Fogg & Associates, LLC; Scott V. Lundberg

(57) ABSTRACT

A integrated access device in a communication network. The integrated access device in one embodiment includes a network port, a plurality of telephony ports, a data port and communication circuit. The network port is adapted to provide dynamic time division multiplex (TDM) interface to a communication network. The plurality of telephony ports are adapted to provide telephony service to subscriber premises equipment. The data port is adapted to provide digital subscriber line (DSL) service to subscriber premises equipment. The communication circuit is coupled to the network port, the plurality of telephony ports and the data port. Moreover, the communication circuit is adapted to carry voice and data signals between the network port and the plurality of telephony ports and the data port. In addition, the integrated access device is line powered over the network port.

33 Claims, 5 Drawing Sheets

OTHER PUBLICATIONS

"LightLink Direct Customer Premise Equipment CPON1315 Optical Node". Pacific Broadband Networks. Feb. 13, 2001. pp. 1–3.*

"Channelized Voice over DSL (CVoDSL) Residential Voice over DSL Technology for Multi–Service Access Platform (MSAP) Equipment" Technology Whitepaper. May 14, 2001. pp. 1–15.*

Black, Uyless, "ATM Foundation for Broadband Networks", Prentice Hall, Copyright 1995, pp. 241–255.

Rice, Liz, "Soft PVCS in an ATM Network", Data Connection Limited, Jan. 23, 2001, pp. 1–9.

Gagnaire, Maurice, "An Overview of Broad–band Access Technology", IEEE, Dec. 1997, pp. 1958–1972.

* cited by examiner

INTEGRATED ACCESS DEVICE

CROSS-REFERENCE TO RELATED APPLICATION

This application claims benefit under 35 U.S.C. §119(e) of U.S. Provisional Application Ser. No. 60/383,048, filed May 24, 2002, which is incorporated herein by reference.

TECHNICAL FIELD

The present invention relates generally to the field of data communications or telecommunications and, in particular, to integrated access devices in communication networks.

BACKGROUND

A common way to provide both voice and data delivery to a subscriber is with the use of integrated access devices (IADs). By combining two services across a single interface, the network provider's operations and management tasks are greatly simplified. Typical interfaces for an IAD include: T1, fractional T1 and generic digital subscriber line (xDSL). Examples of protocols on the network interface include: a time division multiplex (TDM), frame relay, asynchronous transfer mode (ATM) and internet protocol (IP). Typical interfaces to the subscriber are Ethernet, HomePNA, wireless and V.35. Depending on the type of IAD, the bandwidth for the voice and data traffic may be statically or dynamically assigned across the bandwidth provided by the network interface. With a static assignment, the voice traffic is assigned a fixed percentage of the total bandwidth and the data traffic is assigned the remaining bandwidth. With a dynamic assignment, voice traffic is assigned bandwidth on an as needed basis and the data traffic is assigned the remaining bandwidth.

Traditional IDAs require provisioning to bring up the service. Provisioning of the voice ports is typically a simple process. Provisioning of the network port is well understood since the access provider typically controls both ends of the interface. However, provisioning of the data port is more complicated because it must interface with subscriber's equipment. In the case of Ethernet data ports, it's less of a provisioning problem as it is for supplying the required cable. In Ethernet data port applications, category 5 (CAT5) twisted pair cable must be provided to a customer's equipment. For businesses, providing CAT5 is generally not a problem, but it has only recently started to be installed in newly constructed residential homes. The requirement of adding CAT5 cable to existing residential homes is a significant drawback for using an Ethernet data port. Moreover, Ethernet is limited to data signals because it takes up the whole spectrum of frequencies traditionally used for both data and voice signals.

For residential customers or subscribers, several home networking protocols are evolving which could be a potential solution for the data port problems. However, these protocols represent a substantial learning curve for the access provider. Moreover, until there is a clear leader among these protocols, the access providers will be hesitant to support these interfaces.

A better solution for residential data service is to provide asymmetric digital subscriber line (ADSL) services. Access providers are comfortable with deploying ADSL service from a central office (CO) and the ASDL can operate over standard twisted pair telephone cable. Another advantage is that plain old telephone service (POTS) channel and a data signal can both be run over one twisted pair of wires. This is because the analog POTS channel is carried at a lower frequency spectrum and the data signals of the ADSL are carried at a higher frequency spectrum. A disadvantage of ASDL is the provisioning it requires. For ADSL, a virtual channel connection (VCC) must be provisioned at both the IAD and a subscriber's ADSL modem. Some access providers have chosen to standardize on a default VCC for the modems, but this default limits flexibility on how the modem can be used. Moreover, since different access providers have chosen different defaults, the ADSL modem vendors have struggled with ways to provide different defaults for different subscribers. This problem will continue to get worse as ADSL modems become a consumer product that can be purchased at any electronic store.

Some IADs use ADSL as the network port. Typically, the ADSL fed IADs use some form of voice over packet (VoP) such as voice over IP (VoIP) or voice over asynchronous transfer mode (VoATM). A problem with voice over packet technology is the additional complexity in configuring the IAD to handle the voice traffic in addition to the data traffic. A second VCC must be provisioned to support the voice traffic. In addition, the network must provide a gateway function to connect to the public switched telephone network (PSTN). Moreover, the gateway must convert the voice packets to a TDM format.

Another issue with a typical IAD is lifeline POTS support. IADs are typically locally powered and, as such do not operate when the local AC power goes out. The current solutions to this problem are either to provide a separate analog POTS interface or to provide a battery backup. While these solutions do work, they create their own issues. For example, one reason for using an IAD is to provide a single interface for voice and data, so requiring a separate analog POTS interface detracts from the ease of maintenance. Moreover, maintaining a battery at a customer's site requires keeping track of whether the battery is properly charged as well as replacing dead batteries.

A final problem with IADs is that they are typically designed to operate in a narrow temperature range. This makes them only suitable for indoor environments thereby limiting them to serve a single subscriber or multiple subscribers in the same building.

For the reasons stated above, and for other reasons stated below which will become apparent to those skilled in the art upon reading and understanding the present specification, there is a need in the art for an improved integrated access device in communication networks.

SUMMARY

The above-mentioned problems with end-to-end provisioning in communication systems and other problems are addressed by embodiments of the present invention and will be understood by reading and studying the following description.

In one embodiment an integrated access device in disclosed. The integrated access device includes a network port, a plurality of telephony ports, a data port and communication circuit. The network port is adapted to provide dynamic time division multiplex (TDM) interface to a communication network. The plurality of telephony ports are adapted to provide telephony service to subscriber premises equipment. The data port is adapted to provide digital subscriber line (DSL) service to subscriber premises equipment. The communication circuit is coupled to the network port, the plurality of telephony ports and the data port. Moreover, the communication circuit is adapted to carry voice and data signals between the network port and the plurality of telephony ports and the data port. In addition, the integrated access device is line powered over the network port.

In another embodiment, another integrated access device is disclosed. This integrated access device includes a network port, a plurality of telephony ports, a data port, a communication circuit and an automatic permanent virtual circuit connection function. The network port is adapted to provide dynamic time division multiplex (TDM) interface to a communication network. The plurality of telephony ports are adapted to provide telephony service to subscriber premises equipment. The data port is adapted to provide digital subscriber line (DSL) service to subscriber premises equipment. The communication circuit is coupled to the network port, the plurality of telephony ports and the data port. The communication circuit is adapted to carry voice and data signals between the network port and the plurality of telephony ports and the data port. The automatic permanent virtual circuit (PVC) connection activation function is used to learn virtual circuit identifiers of subscriber premise equipment coupled to the data port to create a translation connection between the data port and the network port.

In another embodiment, yet another integrated access device is disclosed. This integrated access device includes a network port, a plurality of telephony ports, a data port and a communication circuit. The network port is adapted to provide dynamic time division multiplex (TDM) interface to a communication network. The plurality of telephony ports are adapted to provide telephony service to subscriber premises equipment. The data port is adapted to provide digital subscriber line (DSL) service to subscriber premises equipment. The communication circuit is coupled to the network port, the plurality of telephony ports and the data port. Moreover, the communication circuit is adapted to carry voice and data signals between the network port and the plurality of telephony ports and the data port. In addition, in this embodiment, the integrated access device contains environmentally hardened components so the integrated access device can be placed in an outside location.

In another embodiment, a communication system is disclosed. The communication system includes at least one integrated access device and a central unit. Each integrated access device includes a network port, a plurality of telephony ports, a data port, a communication circuit and an automatic permanent virtual circuit connection activation function. The network port is adapted to provide dynamic time division multiplex (TDM) interface to a communication network. The plurality of telephony ports are adapted to provide telephony service to subscriber premises equipment. The data port is adapted to provide digital subscriber line (DSL) service to subscriber premises equipment. The communication circuit is coupled to the network port, the plurality of telephony ports and the data port. The communication circuit is further adapted to carry voice and data signals between the network port and the plurality of telephony ports and the data port. The automatic permanent virtual circuit (PVC) connection activation function is used to learn virtual circuit identifiers of subscriber premise equipment coupled to the data port to create a translation connection between the data port and the network port. The central unit is used to selectively couple the communication network to the network port of each integrated access device via an associated digital subscriber line (DSL). In addition, the central unit remotely line powers each integrated access device through each associated DSL.

In another embodiment, a method of operating a integrated access device of a communication system is disclosed. The method comprises detecting initiation of communication on a data port through ADSL signals received from subscriber premise equipment. Learning a virtual circuit identifier for the subscriber premise equipment. Interfacing time division multiplex (TDM) signals having dynamic bandwidth allocation of channels at a network port. Performing translation connections between the data port and the network port and line powering integrated access device over the network port.

In yet another embodiment, a method of operating a communication system is disclosed. The method comprises interfacing a dynamic time division multiplex (TDM) signal to a network port of the integrated access device across a single copper pair wire. Mapping operations instructions for controlling the integrated access device into a DS0 channel in the TDM signal. Detecting initiation of communication between a subscriber premise equipment and at a data port of an integrated access device. Receiving at least one virtual circuit identifier from the subscriber premise equipment at data port. Learning the virtual circuit identifier of the subscriber premise equipment and creating a translation connection between the data port and the network port of the integrated access device.

BRIEF DESCRIPTION OF THE DRAWINGS

The present invention can be more easily understood and further advantages and uses thereof more readily apparent, when considered in view of the description of the preferred embodiments and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Various embodiments of the present invention provide an integrated access device (IAD) that is adapted to receive voice and data traffic over a single network interface and supply multiple POTS and a data interface to a subscriber.

In one embodiment, the IAD is adapted to be line power through the network interface so as to not be dependant on a local power supply. In yet another embodiment the IAD is environmentally hardened so that it can be located in an outside environment. In further another embodiment, an IAD is equipped with an automatic permanent visual circuit connection activation function that automatically learns the virtual circuit identifier of subscriber premise equipment so as to reduce the complexities in provisioning.

Figure 1:
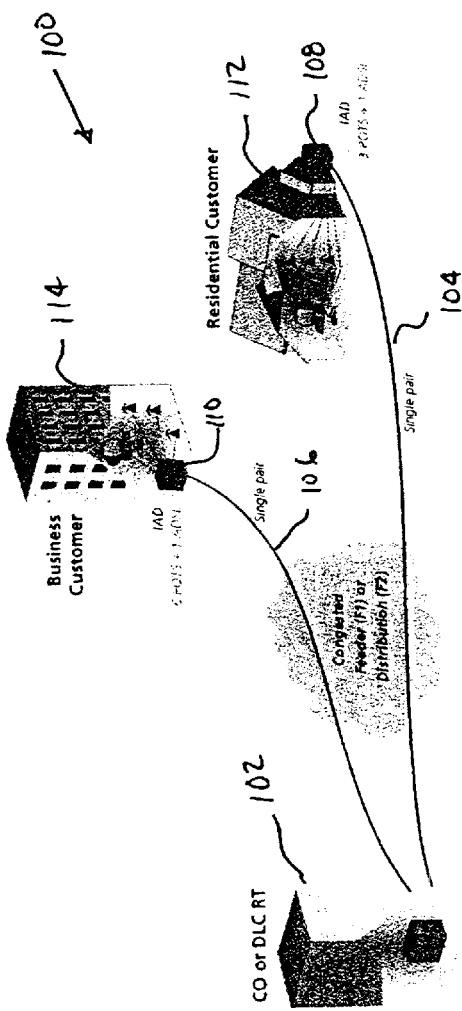
FIG. 1 is a block diagram of a communication system of one embodiment of the present invention.

FIG. 1 is a block diagram of an embodiment of a communication system shown generally at 100. Communication system 100 is one example of a system employing LADs 108, and 110 according to the teaching of the present invention. Illustrated in FIG. 1, is a central office (CO) 102 or central unit (CU), e.g., a PG-Flex Plus shelf commonly available from ADC Telecommunications of Eden Prairie Minn. CO 102 is coupled to IADs 108 and 110 via a single copper pair wire 104 and 106 respectively to provide multiple POTS lines and a data line to each subscriber. In other embodiments, IADs provide only data service over a single twisted pair from CO 102. Moreover, as illustrated in FIG. 1, IAD 108 is coupled to the CO 102 to supply multiple voice lines and a data line to residential customer 112 and IAD 114 is coupled to the CO 102 to supply multiple voice lines and a data line to business customer 114.

Figure 2:
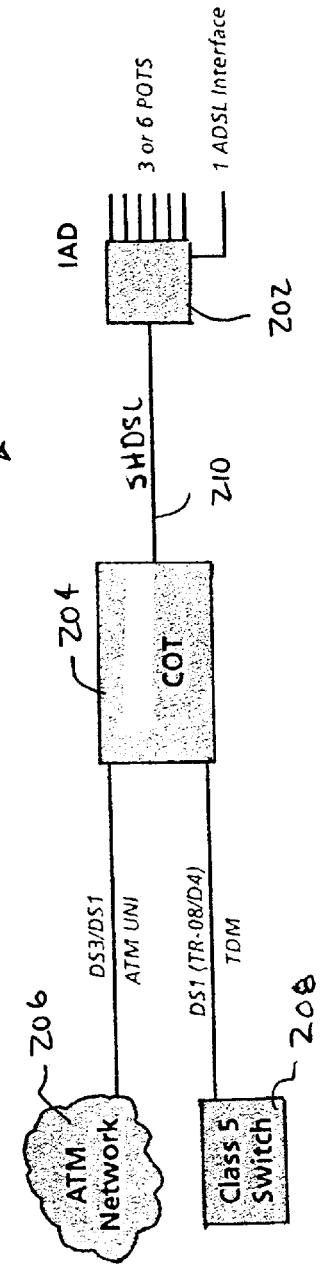
FIG. 2 is a block diagram of another embodiment of a communication system of the present invention.

Referring to FIG. 2, another communication system 200 of one embodiment of the present invention is illustrated. FIG. 2, illustrates a central office terminal 204 (COT) (or CO 204) coupled to an asynchronous transfer mode ATM network 206 and a class 5 switch 208. The CO 204 interfaces data signals with regards to the ATM network and voice signals with regards to class 5 switch 208. The CO 204 further interfaces channelized voice over DSL (CVoDSL) signals using standard SHDSL transmission technology to deliver multiple time division multiplex (TDM) voice signals and ATM data signals over a single copper pair 210 coupling the CO 204 to the IAD 202. In other embodiments the CO 204 may be a digital loop carrier remote terminal (DLC RT), a remote shelf or the like.

In further detail, the IAD 202 is coupled to accept and transmit voice and data to and from the CO 204 across a G.SHDSL interface as TDM traffic. In one embodiment, the IAD 202 supports dynamic bandwidth allocation between the voice and data traffic such that the voice traffic uses no bandwidth on the network port if the voice channels are inactive. That is, within the data stream between the CO 204 and the LAD 202 there are DSO channels that have been assigned x number of voice channels, depending on whether the voice channels are active, and the remaining channels are assigned to data channels. In one embodiment, the dynamic bandwidth allocation of channels is such as is disclosed in the commonly assigned patent application Ser. No. 09/846, 919 which is incorporated herein.

The network interface to the IAD 202 is any TDM based interface including T1, fractional T1, xDSL and the like. DSL technology encompasses a variety of technologies including but not limited to asymmetric digital subscriber line (ADSL), symmetric digital subscriber line (SDSL) including G.SHDSL, high bit rate digital subscriber line (HDSL), very high bit rate digital subscriber line VHDSL, and rate adaptive digital subscriber line (RDSL). One benefit of using TDM mapping between the CO 204 and the IAD 202 is that the combined voice, data and control is routed across any TDM network element. For example, if an IAD interface is T1, then the entire T1 can be carried across multiple T1s, a T3, synchronous optical network (SONET) or any of the many other TDM based standard interfaces. In any one of these ways, the T1 is delivered to network equipment that extracts voice, data and control information from the TDM stream. In particular, in one embodiment of the present invention, a control channel is mapped into DSOs of the TDM channels. The control channel carries information for POTS signaling, dynamic bandwidth control, IADs control and the like. Moreover, by providing TDM for the POTS, provisioning and gateway problems to support voice over packets are eliminated. Public switched telephone network (PSTN) uses TDM for handling voice traffic. The TDM voice signals from the IADs 202 are routed directly to the PSTN without need to convert packets to TDM.

In one embodiment, the IAD 202 is line powered from the CO 204 across the single copper pair 110. By using line powering, the IAD 202 is not reliant on local AC power. Moreover, with line powering, the IADs 202 supports lifeline POTS without the need for a separate analog pair or the need for batteries. Further, in one embodiment, line powering allows the IAD 202 to take advantage of the battery backup provided at the CO 204. In other embodiments of the present invention, the line powering is supplied to the IAD 202 by a digital loop carrier (DLC) remote, a remote shelf or the like.

In yet another embodiment, the IAD 202 is environmentally hardened so it can be located in an outside environment. In this embodiment, IAD 202 has components that are adapted to operate over a wide range of temperatures and to survive lightening induced events.

Figure 3:
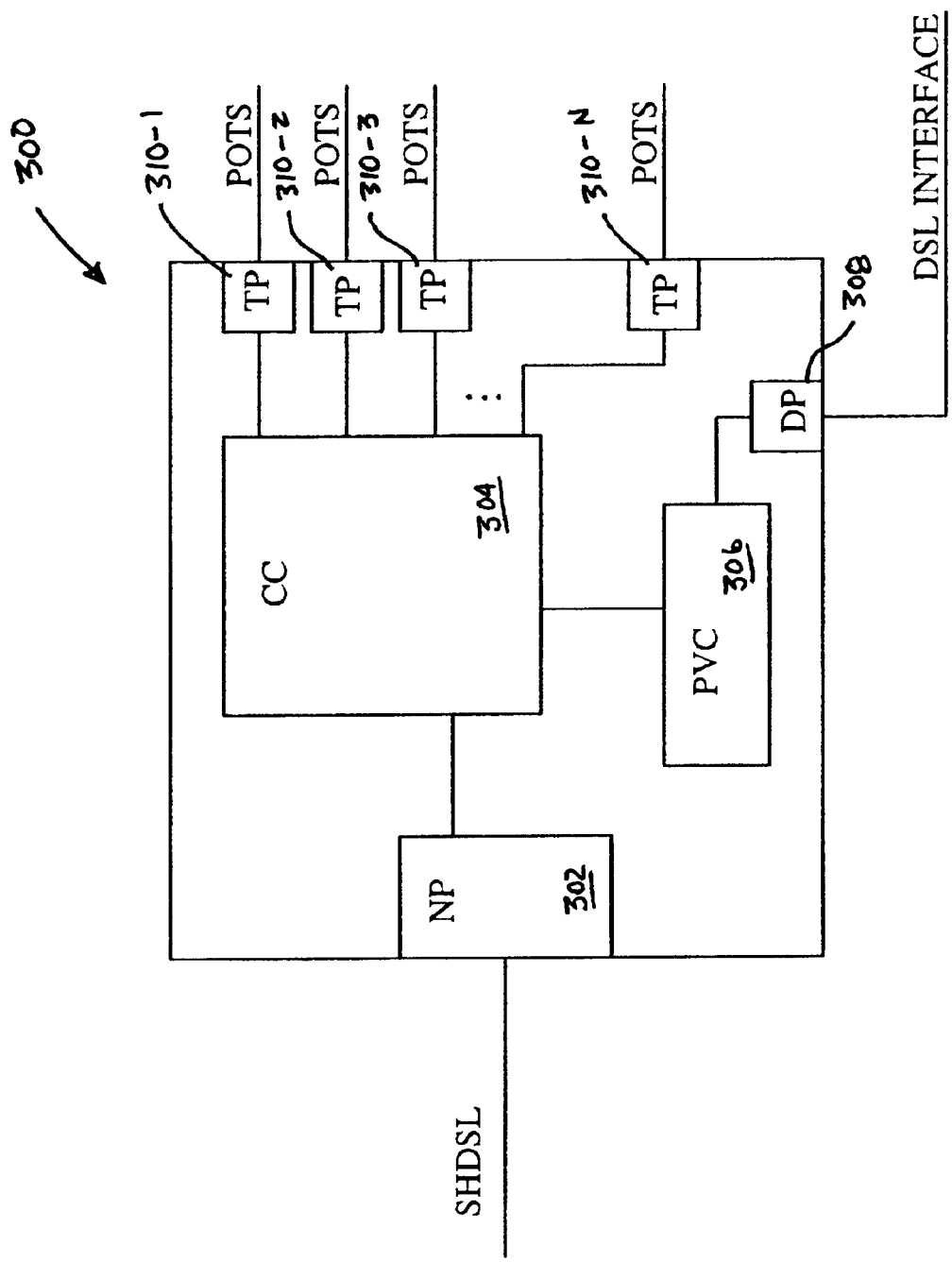
FIG. 3 is a block diagram of an integrated access device of one embodiment of the present invention.

One embodiment of an IADs 300 of the present invention is illustrated in FIG. 3. As illustrated in FIG. 3, this IADs 300 includes a network port (NP) 302 that provides a dynamic TDM interface to a communication network, like the CO 205, ATM network 206 and class 5 switch 208 of FIG. 2. The IAD 300 also includes a plurality of telephony ports (TP) 310(1−N). That is, in this embodiment, more than one POTS line service can be provided to a subscriber. In addition, the embodiment of FIG. 3 further includes a data port 308. The data port 308 provides DSL service to subscriber premise equipment. A communication circuit 304 is used to carry voice and data signals between the ports 302, 310(1−N) and 308.

The IAD 300 also includes an automatic provisioning circuit (PVC) circuit activation function 306 that learns the virtual circuit identifiers of subscriber premise equipment coupled to the data port 308 and creates a translation between the data port 308 and the network port 302. In particular, the automatic provisioning circuit 306 employs an algorithm to learn a virtual circuit identifier from an associated subscriber premise equipment such as a modem. The PVC algorithm may be implemented in hardware or software. In one embodiment, the PVC activation is such as is disclosed in the commonly assigned U.S. patent application Ser. No. 09/833,780 which is herein incorporated by reference.

Figure 4:
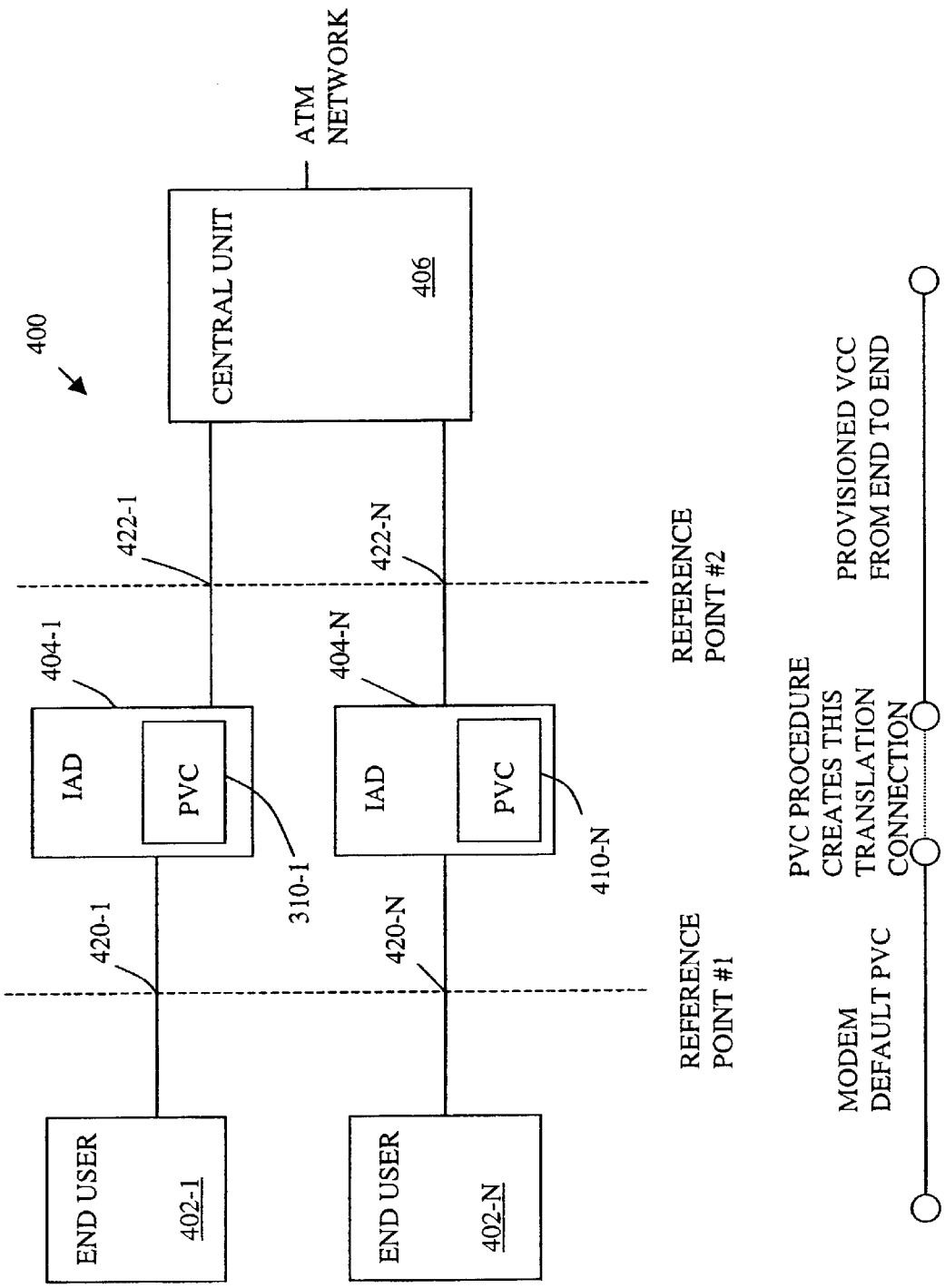
FIG. 4 is a block diagram of another communication system of the present invention illustrating aspects of the auto provisioning.

Referring to FIG. 4, another embodiment of a communication system 400 of the present invention is illustrated. In particular, communication system 400 illustrates how an automatic permanent virtual circuit (PVC) connection activation function 410-1 to 410-N of one embodiment the present invention is implemented. Interfaces 420-1 to 420-N are located at reference point 1 that lays between each end user 402-1 to 420-N and its respective IADs 404-1 to 404-N. Interfaces 420-1 to 420-N are protocols for communications between end users (subscribers) 402-1 to 402-N and IAD 404-1 to 404-N, respectfully. Moreover, interfaces 422-1 to 422-N are protocols for communications between IAD 404-1 to 404-N and central unit 406 (central office 406). In the embodiment of FIG. 4, when a modem (or other subscriber premise equipment) for one of the end user 402-1 to 402-N initiates a session, the PVC 410-1 to 410-N of an associated IAD 404-1 to 404-N learns the modem's virtual circuit identifier and translates it to a pre-configured virtual circuit connection (VCC) on the network port. In this way, the IAD network port and the network equipment with which it connects can be provisioned in a consistent manner regardless of the modem's virtual circuit identifier. This auto learning technique provides the access provider the flexibility to connect to any type of ADSL modem or like equipment.

Figure 5:
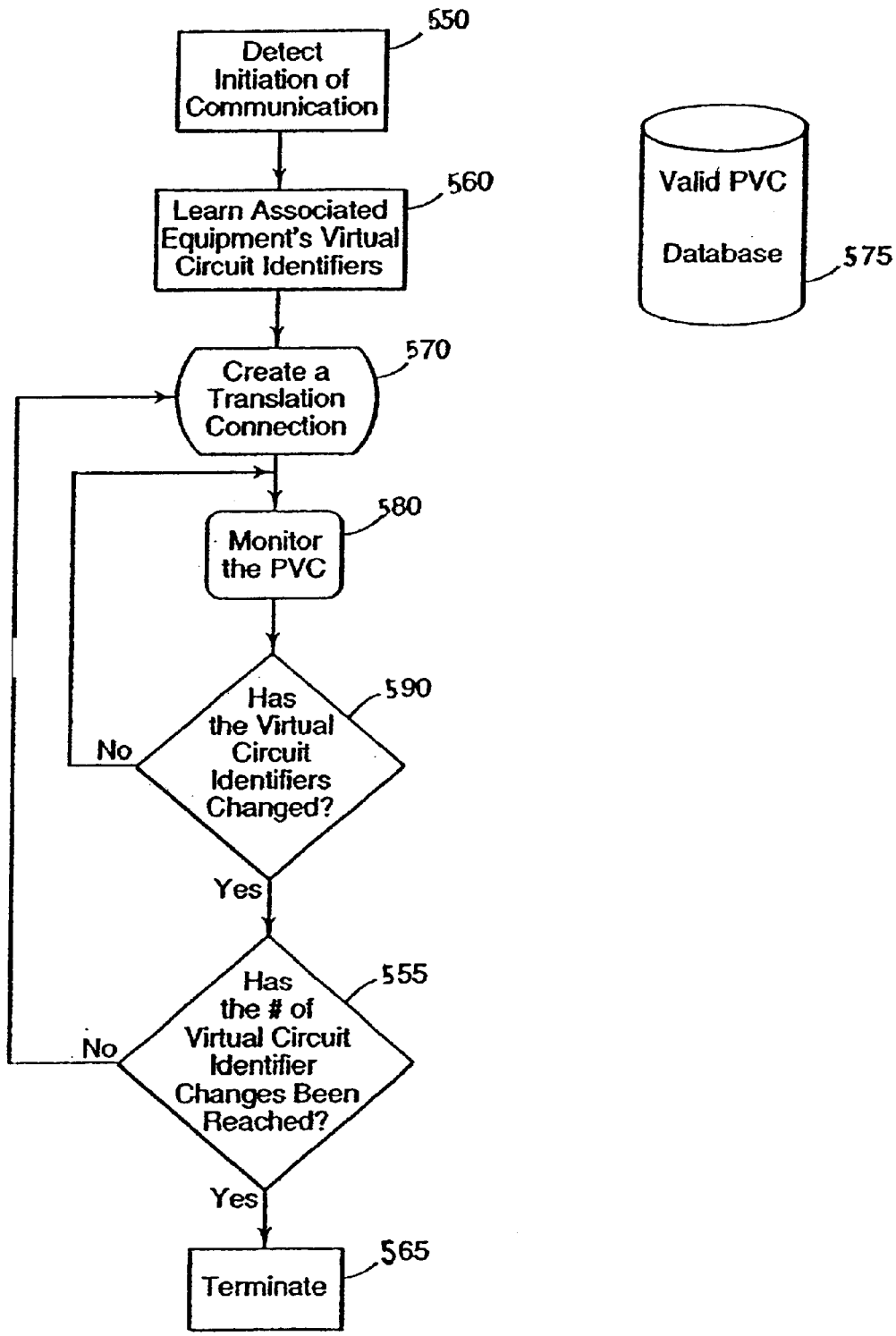
FIG. 5 is a flow chart illustrating one method of creating a translation connection according to the teachings of the present invention.

FIG. 5 is a flow chart of one embodiment of a method for automatically configuring a permanent virtual circuit (PVC) connection according to the teachings of the present invention. The method of FIG. 5 begins at block 550 and detects the initiation of communication between two network elements such as an end user's modem and an associated IAD. Detecting the initiation of communication between two network elements includes monitoring traffic between the two network elements. In one embodiment, detecting the initiation of communication consists of monitoring the arrival of one or more "framed payload structure(s)", such as an ATM cell, high level data link control (HDLC) packet, point-to-point protocol (PPP) protocol data unit (PDU), layer 2 tunneling protocol (L2TP) PDU or other encoding for any connection oriented protocol.

The method then proceeds to block 560 where it learns the virtual circuit identifier value of the associated equipment. For example, in one embodiment, at block 560, the method learns the virtual circuit identifier values of a modem associated with the end user and is provided the virtual circuit identifier values of an associated central unit. In another embodiment, at block 560, the method learns the virtual circuit identifier values of the end user's equipment and the central unit. In one embodiment, the method learns the virtual circuit identifier values of the end user's equipment and/or an associated central unit by monitoring virtual circuit identifier values transmitted from the end user's equipment and/or the central unit. When a valid PVC value is detected, as defined by "valid PVC data base" at block 575 then the method proceeds to block 570 and creates a translation connection between the end user's equipment and the central unit. At block 580, the method monitors the permanent virtual circuit connection's "virtual circuit identifier" on one or both links between the end user's equipment and the IAD and between the IAD and the central unit and then proceeds to block 590.

At block 590, the method determines whether or not the IADs's virtual circuit identifier value has changed to a new valid PVC value, as defined by "valid PVC data base" at block 575. When the IAD's virtual circuit identifier value has not changed the method proceeds back to block 580 and resumes monitoring the permanent virtual circuit for any changes. When the IADs's virtual circuit identifier value has changed to a new valid PVC value, as defined by the "valid PVC data base" at block 575, then the method proceeds to block 555 and determines if a pre-determined number of changes of the remote unit's virtual circuit identifier values has been reached. The pre-determined number of changes of virtual circuit identifier values at the IAD acts as a safety mechanism. In normal operation, there are limited cases in which the IAD's virtual circuit identifier values will need to change. In order to limit changing of virtual circuit identifier values by hackers attempting to stay anonymous the method "times-out" and does not permit the user to proceed after "X" number of value changes that occur over some time period. In one embodiment, the network provider or other network manager sets the value of X. In another embodiment, the network provider or other network manager can also disable operation of the safety mechanism.

When the predetermined number of changes has been reached the method proceeds to step 565 and the method terminates. The termination procedure may include various security policies including disconnecting the current translation connections. When the number of virtual circuit identifier value changes has not been exceeded the method proceeds to block 570 and creates or "recreates" a translation connection based on the new virtual circuit identifier value.

In an alternate embodiment, steps 555 and 565 are omitted and when the method reaches step 580 if the virtual circuit identifier value has changed to a new value as defined by the "valid PVC data base" at block 575 then the method proceeds to step 570 and creates a translation connection based on the new virtual circuit identifier value.

Figure 6:
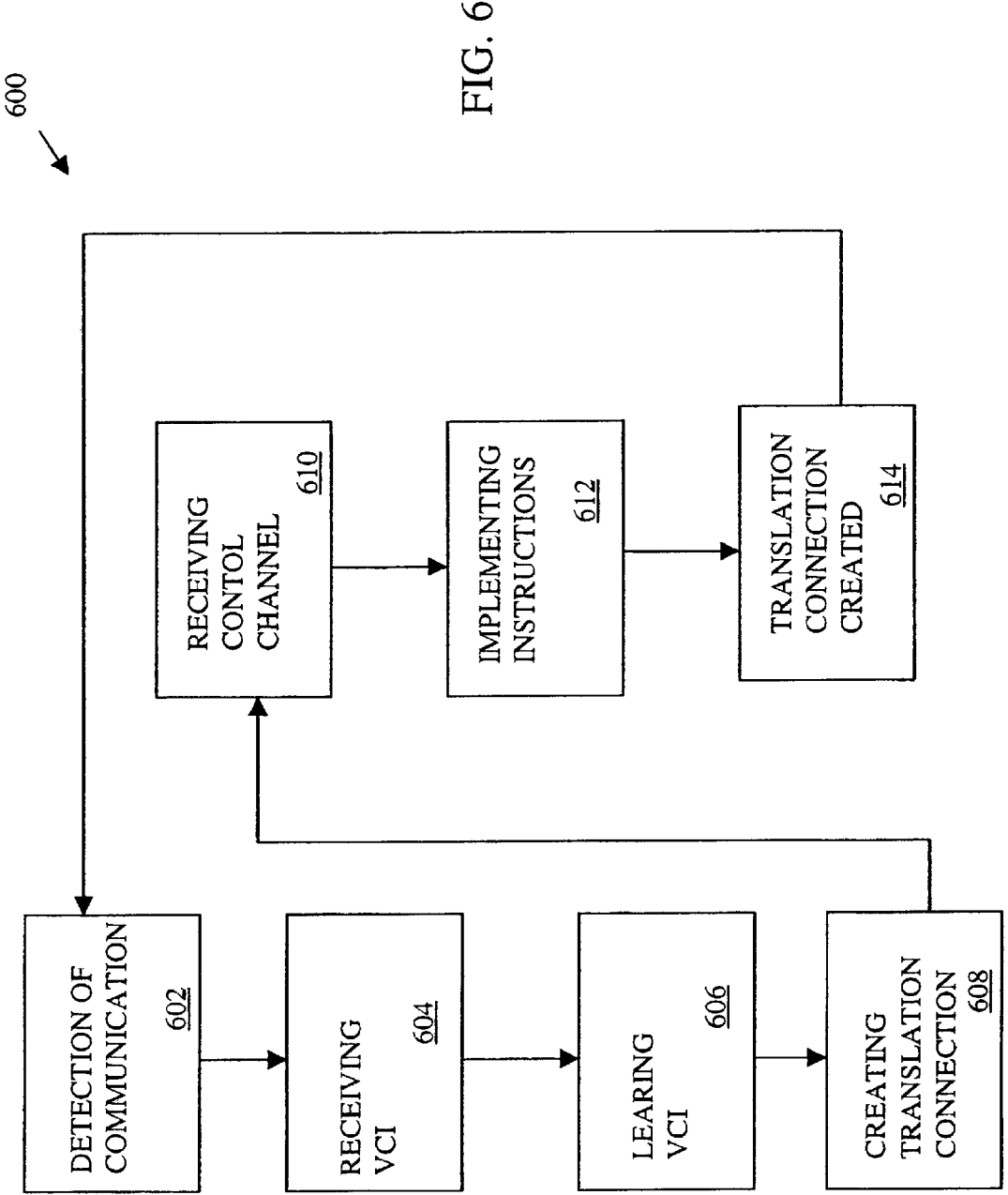
FIG. 6 is a flow chart illustrating one method of operation of the present invention.

Referring to FIG. 6, a flow chart illustrating one method of operation of the present invention is shown. At block 602, a communication from a subscriber premise equipment is detected at an IAD. The virtual circuit identifier VCI is read from the communication at block 604. At block 606, the VCI is learned by the IAD. The IAD creates a translation connection 608 between the subscriber premise equipment and a central unit at box 608. At box 610, the IAD receives control signals in a control channel from the central unit. The IADs implements the instruction in the control signal at block 612. The instructions control the operation of the IADs. At box 614, a translation connection is created between the subscriber premise equipment and the central unit. The IAD then waits for another communication to be detected. It starts over at block 602 when another communication is detected.

Although specific embodiments have been illustrated and described herein, it will be appreciated by those of ordinary skill in the art that any arrangement, which is calculated to achieve the same purpose, may be substituted for the specific embodiments shown. This application is intended to cover any adaptations or variations of the present invention. Therefore, it is intended that this invention be limited only by the claims and the equivalents thereof.

What is claimed is:

1. An integrated access device comprising:
   a network port adapted to provide dynamic time division multiplex (TDM) interface to a communication network;
   a plurality of telephony ports adapted to provide telephony service to subscriber premises equipment;
   a data port adapted to provide digital subscriber line (DSL) service to subscriber premises equipment;
   a communication circuit, coupled to the network port, the plurality of telephony ports and the data port, the communication circuit adapted to carry voice and data signals between the network port and the plurality of telephony ports and the data port;
   wherein the integrated access device is line powered over the network port; and
   an automatic permanent virtual circuit (PVC) connection activation function to learn virtual circuit identifiers of subscriber premise equipment coupled to the data port to create a translation connection between the data port and the network port, the automatic PVC connection activation function further adapted to disconnect a translation connection based on the number of times the virtual circuit identifier changes to prevent unauthorized access to the communication network.

2. The integrated access device of claim 1, wherein disconnecting the translation connection is based on the number times the virtual circuit identifier changes during a specific period of time.

3. The integrated access device of claim 1, wherein the integrated access device is line powered from a remote location.

4. The integrated access device of claim 1, wherein the network port is adapted to receive device control signals mapped into a DSO channel of received TDM voice and data signals.

5. The integrated access device of claim 1, wherein ATM traffic is mapped over TDM DSO channels on the network port.

6. The integrated access device of claim 1, wherein components that make up the integrated access device are environmentally hardened to allow the integrated access device to be placed in an outside location.

7. The integrated access device of claim 1, wherein the network port is one from a group consisting of, T1, fractional T1 and xDSL.

8. The integrated access device of claim 1, wherein the integrated access device is line powered over the network port by one from a group consisting of a central unit, a digital loop carrier remote and a remote shelf.

9. An integrated access device comprising:
a network port adapted to provide dynamic time division multiplex (TDM) interface to a communication network;
a plurality of telephony ports adapted to provide telephony service to subscriber premises equipment;
a data port adapted to provide digital subscriber line (DSL) service to subscriber premises equipment;
a communication circuit, coupled to the network port, the plurality of telephony ports and the data port, the communication circuit adapted to carry voice and data signals between the network port and the plurality of telephony ports and the data port; and
an automatic permanent virtual circuit (PVC) connection activation function to learn virtual circuit identifiers of subscriber premise equipment coupled to the data port to create a translation connection between the data port and the network port, the automatic PVC connection activation function further adapted to terminate a translation connection when a predetermined number of changes to an associated virtual circuit identifier has been reached during a specific period of time.

10. The integrated access device of claim 9, wherein the network port is adapted to receive device control signals mapped into a DSO channel of received TDM voice and data signals.

11. The integrated access device of claim 9, wherein ATM traffic is mapped over TDM DSO channels on the network port.

12. The integrated access device of claim 9, wherein the network port is a T1 interface.

13. The edge remote of claim 12, wherein the entire T1 can be carried across is one from a group consisting of, multiple T1s, a T3 and synchronous optical network (SONET).

14. An integrated access device comprising;
a network port adapted to provide dynamic time division multiplex (TDM) interface to a communication network;
a plurality of telephony ports adapted to provide telephony service to subscriber premises equipment;
a data port adapted to provide digital subscriber line (DSL) service to subscriber premises equipment;
a communication circuit, coupled to the network port, the plurality of telephony ports and the data port, the communication circuit adapted to carry voice and data signals between the network port and the plurality of telephony ports and the data port;
wherein the integrated access device contains environmentally hardened components so the integrated access device can be placed in an outside location;
an automatic permanent virtual circuit (PVC) connection activation function to learn virtual circuit identifiers of subscriber premise equipment coupled to the data port to create a translation connection between the data port and the network port, the automatic PVC connection activation function further adapted to monitor the value of each virtual circuit identifier and limit the number of times the value of a virtual circuit identifier changes to prevent unauthorized access to the communication network.

15. The integrated access device of claim 14,
wherein the limit to the number of times the value of a virtual circuit identifier changes is determined within a specified time period.

16. The integrated access device of claim 14, wherein the network port is adapted to receive device control signals mapped into a DSO channel of received TDM voice and data signals.

17. The integrated access device of claim 14, wherein ATM traffic is mapped over TDM DSO channels on the network port.

18. A communication system comprising:
at least one integrated access device, each integrated access device comprising,
a network port adapted to provide dynamic time division multiplex (TDM) interface to a communication network,
a plurality of telephony ports adapted to provide telephony service to subscriber premises equipment,
a data port adapted to provide digital subscriber line (DSL) service to subscriber premises equipment,
a communication circuit, coupled to the network port, the plurality of telephony ports and the data port, the communication circuit adapted to carry voice and data signals between the network port and the plurality of telephony ports and the data port,
an automatic permanent virtual circuit (PVC) connection activation function to learn virtual circuit identifiers of subscriber premise equipment coupled to the data port to create a translation connection between the data port and the network port, the automatic PVC connection activation function further adapted to terminate a translation connection when a predetermined number of changes to an associated virtual circuit identifier has been reached during a specific period of time; and
a central unit to selectively couple the communication network to the network port of each integrated access device via an associated digital subscriber line (DSL), wherein the central unit remotely line powers each integrated access device through each associated DSL.

19. The communication system of claim 18, wherein TDM signals in each DSL have dynamic bandwidth allocation of channels that include a control channel that controls the operation of each integrated access device.

20. The communication system of claim 18, wherein ATM traffic is mapped over TDM DS0 channels on the network port of the integrated access device.

21. The communication system of claim 18, wherein components that make up the integrated access device are environmentally hardened to allow the integrated access device to be placed in an outside location.

22. The communication system of claim 18, wherein the central unit is one from a group comprising, a central office, digital loop carrier remote terminal (DLC RT) and a remote shelf.

23. The communication system of claim 18, wherein the TDM signals contain both voice and data signals.

24. The communication system of claim 18, wherein the TDM signals contains data signals.

25. A method of operating a integrated access device of a communication system, the method comprising:
    detecting initiation of communication on a data port through DSL signals received from subscriber premise equipment;
    learning a virtual circuit identifier for the subscriber premise equipment;
    forming a permanent virtual circuit based on rules defined in a database;
    interfacing time division multiplex (TDM) signals having dynamic bandwidth allocation of channels at a network port;
    performing translation connections between the data port and the network port;
    line powering integrated access device over the network port;
    monitoring the virtual circuit identifier;
    counting the number of times the virtual circuit identifier changes over a predetermined period of time; and
    when the virtual circuit identifier has changed a predetermined number of times during the predetermined period of time, disconnecting current translation connections.

26. The method of claim 25, further comprising:
    receiving control signals mapped into a control channel within the TDM signals at the network port; and
    implementing instructions in a control signals.

27. The method of claim 25, further comprising:
    interfacing plain old telephone service (POTS) signals at a plurality of telephony ports.

28. The method of claim 25, wherein the TDM signals contain both voice and data signals.

29. A method of operating a communication system, the method comprising:
    interfacing a dynamic time division multiplex (TDM) signal to a network port of the integrated access device across a single copper pair wire;
    mapping operations instructions for controlling the integrated access device into a DS0 channel in the TDM signal;
    detecting initiation of communication between a subscriber premise equipment and at a data port of an integrated access device;
    receiving at least one virtual circuit identifier from the subscriber premise equipment at data port;
    learning the virtual circuit identifier of the subscriber premise equipment;
    providing a time out function to prevent unauthorized access to the communication system by limiting the number of times a virtual circuit identifier changes over a select amount of time; and
    creating a translation connection between the data port and the network port of the integrated access device when authorized.

30. The network port of claim 29, further comprising:
    line powering the integrated access device over the network port.

31. The method of claim 29, wherein the TDM signal contains voice and data signals.

32. The method of claim 29, wherein the TDM signal contains data signals.

33. The method of claim 29, further comprising:
    interfacing one or more POTS lines to a subscriber through one or more telephony ports in the integrated access device.

* * * * *